United States Patent
Otomo et al.

[11] Patent Number: 6,108,075
[45] Date of Patent: Aug. 22, 2000

[54] LASER BEAM EMITTING APPARATUS

[75] Inventors: Fumio Otomo; Kunihiro Hayashi, both of Tokyo, Japan

[73] Assignee: Kabushiki Kaisha Topcorn, Tokyo, Japan

[21] Appl. No.: 09/266,530

[22] Filed: Mar. 11, 1999

[30] Foreign Application Priority Data

Mar. 15, 1998 [JP] Japan .................................. 10-085055

[51] Int. Cl.$^7$ .................................................. G01B 11/26
[52] U.S. Cl. .......................................... 356/138; 356/139.1
[58] Field of Search ..................................... 356/138, 143, 356/142, 148, 141.1, 138.1, 139.07, 249, 250, 152, 248, 152.1, 147, 139.04, 140, 141.2, 152.3; 33/281, 282, 285, 286, 290, 291, 292

[56] References Cited

U.S. PATENT DOCUMENTS

| | | | |
|---|---|---|---|
| 4,895,440 | 1/1990 | Cain et al. | 356/5 |
| 5,784,155 | 7/1998 | Ohtomo et al. | 356/141.1 |
| 5,867,263 | 2/1999 | Ohtomo et al. | 356/247 |

*Primary Examiner*—Frank G. Font
*Assistant Examiner*—Michael P. Stafira
*Attorney, Agent, or Firm*—Baker Botts L.L.P.

[57] ABSTRACT

The present invention provides a rotary laser beam emitting apparatus capable of being inclined in a direction coinciding with the direction of a reflector. A light emitting unit emits a laser beam, a rotary laser beam projecting unit projects and turns the laser beam emitted by the light emitting unit in a plane, a first photodetector receives at least part of the laser beam projected by the rotary laser beam projecting unit from a predetermined direction, a second photodetector detects a reflected laser beam reflected from a reflector, and a data processing means determines an error in the direction of a main body relative to the reflector on the basis of detection signals provided by the first and the second photodetector.

17 Claims, 8 Drawing Sheets

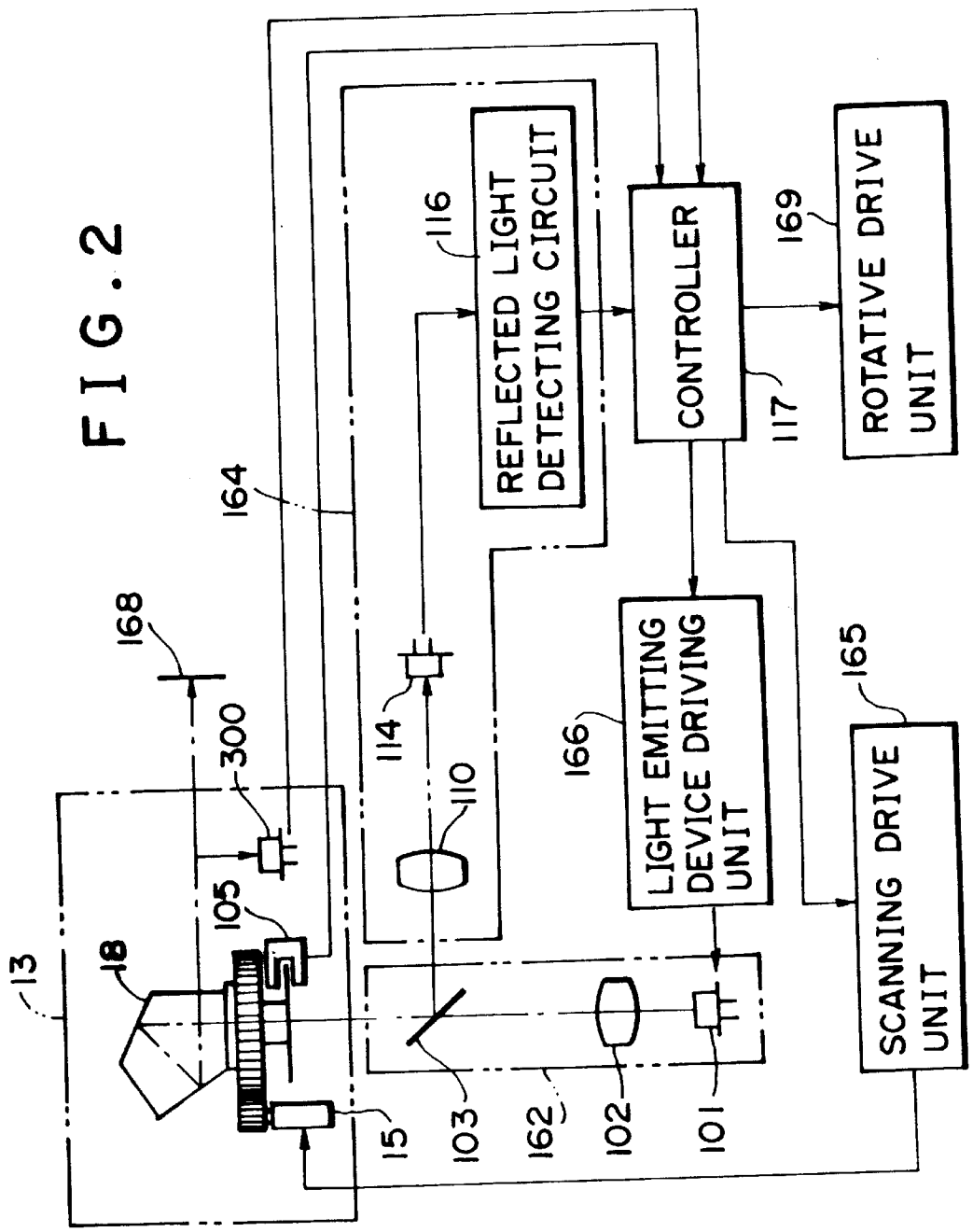

FIG. 12(A) PRIOR ART
FIG. 12(B) PRIOR ART
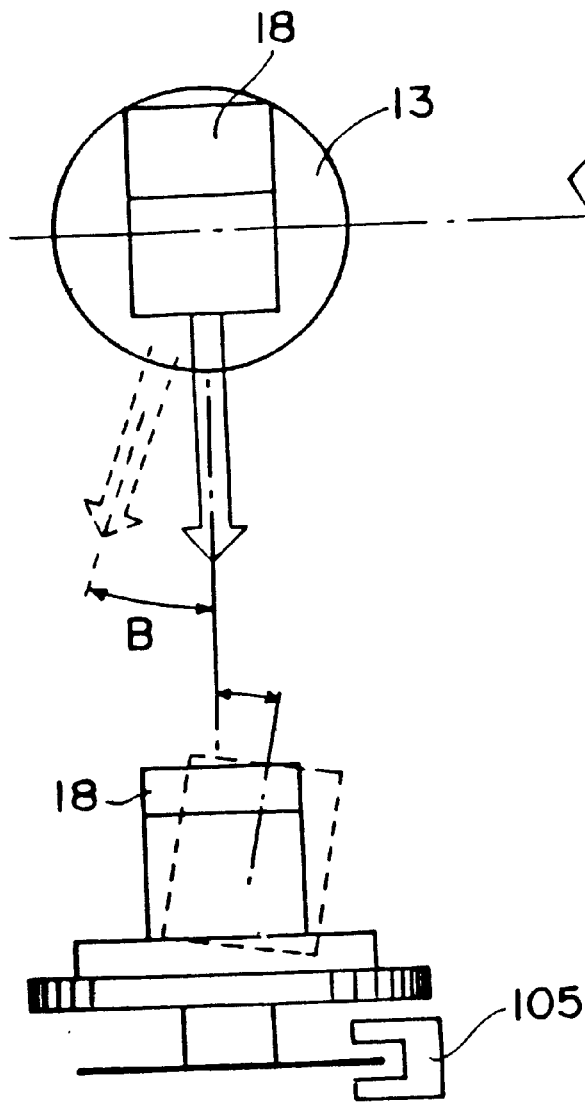
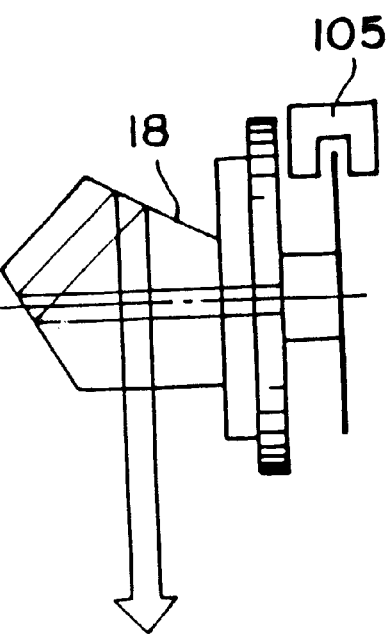

LASER BEAM EMITTING APPARATUS

BACKGROUND OF THE INVENTION

The present invention relates to a rotary laser beam emitting apparatus and, more particularly, to a rotary laser beam emitting apparatus capable of being inclined in a direction coinciding with the direction of a reflector.

A conventional rotary laser beam emitting apparatus for forming a reference plane is used also for finding a target point, for enhancing visibility by go-and-return laser beam scanning and a laser beam point and for forming an inclined reference plane.

A reflector for reflecting a laser beam to find a position is disposed at the target point, the rotary laser beam emitting apparatus emits a laser beam toward the reflector, the reflector reflects the laser beam toward the rotary laser beam emitting apparatus, and then the rotary laser beam emitting apparatus finds the position of the reflector from the reflected laser beam.

The construction of the rotary laser beam emitting apparatus will be described with reference to FIG. 10. A laser beam emitted by a light emitting unit 162 is deflected perpendicularly and turned in a plane by a pentagonal prism 18 included in a rotary light beam projecting unit 13. The laser beam is reflected by a reflector 168 disposed at a target point toward the laser beam emitting apparatus. The reflected light beam falls on the pentagonal prism 18 of the rotary laser beam projecting unit 13 and is reflected by a half mirror 103 (or an apertured mirror) toward a photodetecting unit 104. The light emitting unit 162 comprises a light emitting diode 101, a collimator lens 102 and the half mirror 103. The photodetecting unit 104 comprises a condenser lens 110, a second photodetecting device 114 and a reflected light detecting circuit 116. The laser beam received by a reflected light detecting unit 164 is detected by the reflected light detecting circuit 116. A controller 117 calculates the direction of the reflector 168 on the basis of a detection signal provided by the reflected light detecting unit 164 and a signal provided by an ecnoder 105 and indicating an angular position of the rotary laser bean projecting unit 13, and a scanning motor 15 is controlled by a scanning drive unit 165 to direct the laser beam toward the reflector.

When forming an inclined plane in the direction of the reflector 168, the direction of the reflector 168 and the direction of the rotary laser beam emitting apparatus are calculated on the basis of a detection signal provided by the reflected light detecting circuit 116 and a signal provided by the encoder 105, and then the rotary laser beam emitting apparatus is turned so as to make the directions coincide with each other.

However, this conventional laser beam emitting apparatus detects the emitting direction of the laser beam indirectly on the basis of the signal provided by the encoder interlocked with the rotary laser beam projecting unit 13. Therefore, the direction of the laser beam projected by the rotary laser beam projecting unit 13 must accurately coincide with the output of the encoder.

However, since moving parts have some play, and the moving parts need some play. Accordingly, if the rotary laser beam projecting unit 13 has play in a horizontal direction, the rotary laser beam projecting unit 13 moves as shown in FIG. 11 and the laser beam is translated by a distance A. If the rotary laser beam projecting unit 13 is inclined, the pentagonal prism 18 is inclined as shown in FIG. 12 and the rotating direction changes by an angle B. The distance A and the angle B cause errors in the signal provided by the encoder and an actual laser beam projecting direction, and the laser beam projecting direction does not coincide with the signal provided by the encoder.

Generally, since construction works are carried out in the range of several hundreds meters on the basis of a reference plane and an inclined plane defined by the laser beam, even a slight error brings about serious problems.

SUMMARY OF THE INVENTION

According to the present invention, a light emitting unit emits a laser beam, a rotary laser beam projecting unit projects and turns the laser beam emitted by the light emitting unit in a plane, a first photodetector receives at least a part of the laser beam projected by the rotary laser beam projecting unit from a predetermined direction, a second photodetector detects a reflected laser beam reflected from a reflector, and a data processing means determines an error in the directions of a main body relative to the reflector.

BRIEF DESCRIPTION OF THE DRAWINGS

FIG. 2 is a block diagram of assistance in explaining an optical system and an electrical system included in the laser beam emitting apparatus shown in FIG. 1;

FIG. 12 is a schematic view of assistance in explaining the laser beam emitting apparatus shown in FIG. 10.

DETAILED DESCRIPTION OF THE PREFERRED EMBODIMENTS (Principle)

Figure 4:
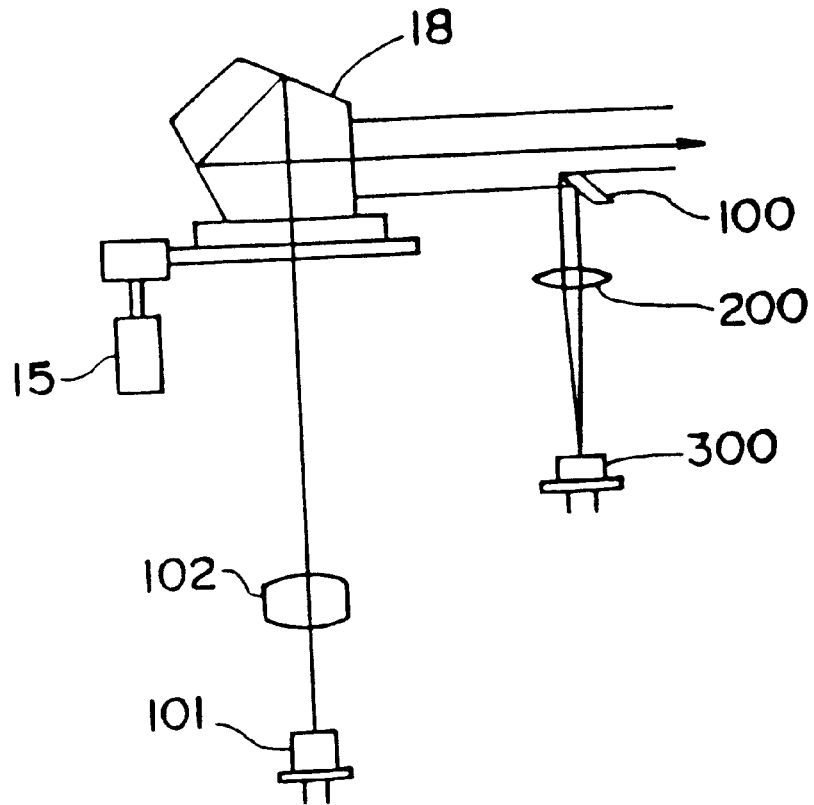
FIG. 4 is a diagrammatic view of assistance in explaining the principle of the laser beam emitting apparatus shown in FIG. 1.
Figure 5:
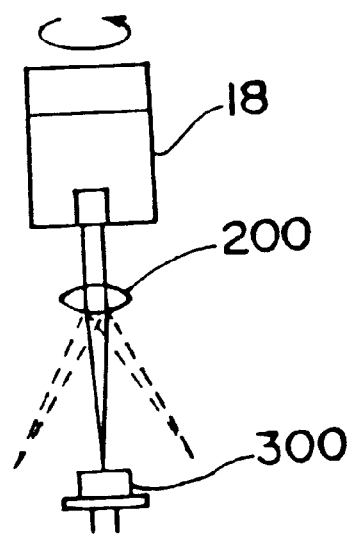
FIG. 5 is a diagrammatic view of assistance in explaining the principle of the laser beam emitting apparatus shown in FIG. 1.
Figure 9:
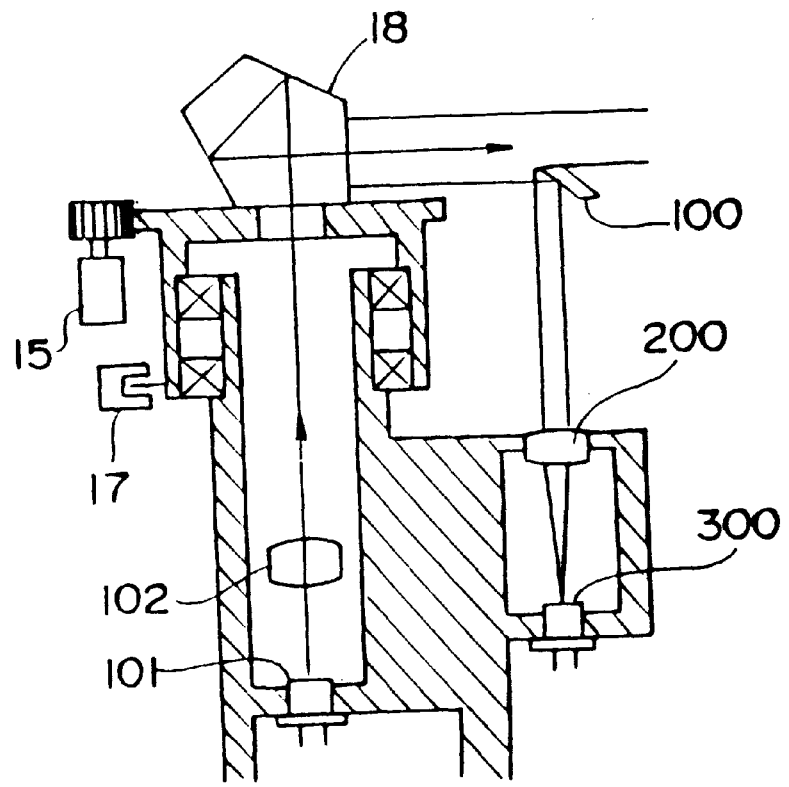
FIG. 9 is a schematic sectional view of assistance in explaining the principle of the laser beam emitting apparatus shown in FIG. 1.
Figure 11:
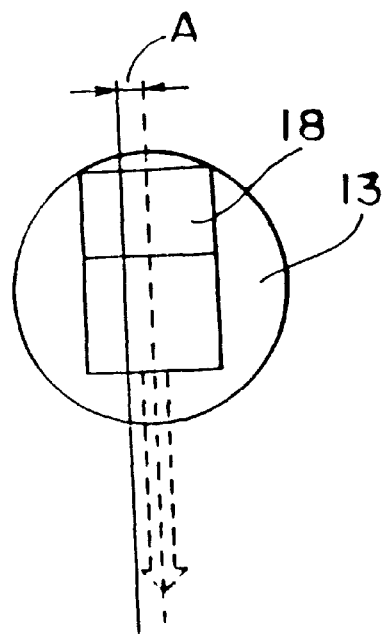
FIG. 11 is a diagrammatic view of assistance in explaining the laser beam emitting apparatus shown in FIG. 10.
Figure 10:
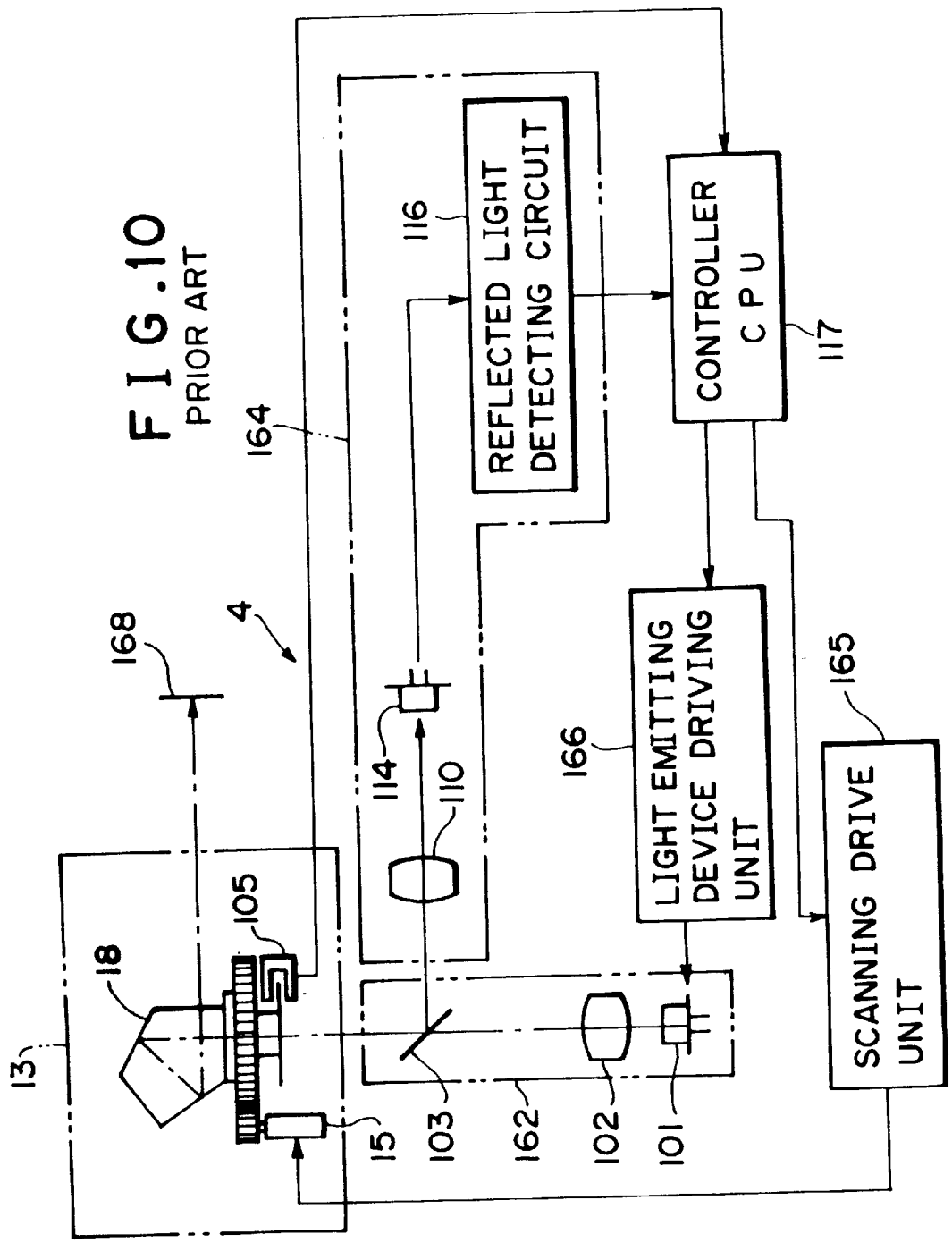
FIG. 10 is a block diagram of a conventional laser beam emitting apparatus.

The principle of a laser beam emitting apparatus in a preferred embodiment according to the present invention will be described with reference to FIGS. 4 and 9. A mirror 100 is disposed between a pentagonal prism 18 and a reflector 168. A laser beam reflected by the mirror 100 travels through a condenser lens 200 and falls on a first first photodetector 300. When the laser beam reflected by the pentagonal prism 18 travels in a predetermined direction, the laser beam reflected by the mirror 100 travels vertically downward and falls on a central part of the first photodetector 300. When the laser beam reflected by the pentagonal prism 18 travels in a direction different from the predetermined direction, the laser beam reflected by the mirror 100 does not fall on the first photodetector 300. Therefore, it is decided that the traveling direction of the laser beam reflected by the pentagonal prism 18 coincides with a direction in which a main body 4 is inclined when the laser beam reflected by the mirror 100 falls on the first photodetector 300.

Figure 6:
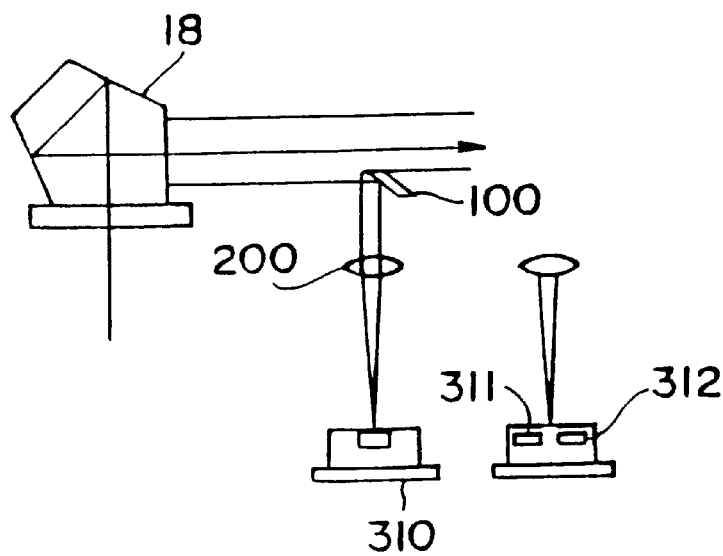
FIG. 6 is a diagrammatic view of assistance in explaining the principle of the laser beam emitting apparatus shown in FIG. 1.
Figure 7:
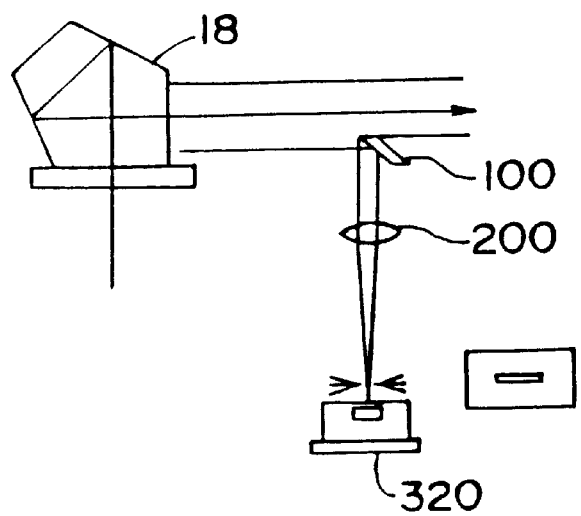
FIG. 7 is a diagrammatic view of assistance in explaining the principle of the laser beam emitting apparatus shown in FIG. 1.
Figure 8:
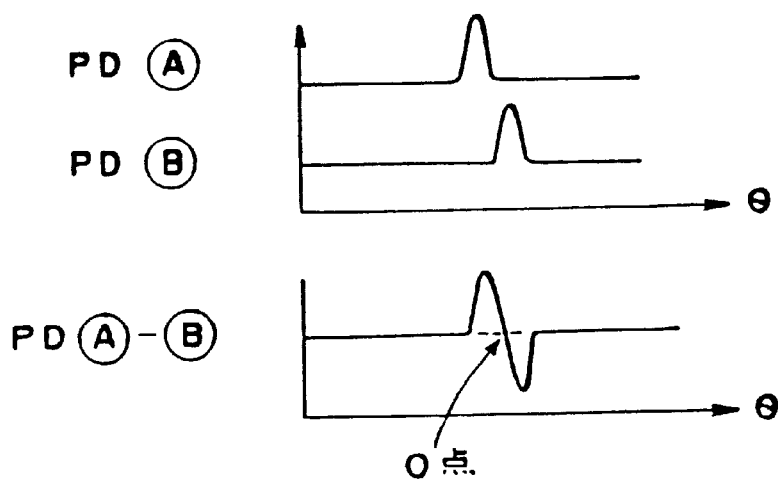
FIG. 8 is a diagrammatic view of assistance in explaining the principle of the laser beam emitting apparatus shown in FIG. 1.

Referring to FIG. 6, a two-section photodetector 310 may be employed as the first photodetector 300. The two-section photodetector 310 has a first photodetecting section 311 and a second photodetecting section 312. The first photodetector 300 corresponds to the first photodetecting section. Output signals provided by the two-section photodetector 310 have waveforms as shown in FIG. 8. A continuous waveform is formed by subtracting the output signal of the second photodetecting section 312 from that of the first photodetecting section 311. A zero-cross point corresponds to a reference position for the pentagonal prism 18. When the pentagonal prism 18 is in the reference position, the traveling direction of the laser beam reflected by the pentagonal prism 18 coincides with the direction of the main body 4. An integral photodetector 320 as shown in FIG. 7 may be used instead of the two-section photodetector 310. A half silvered-mirror may be used as the mirror 100.

Embodiments

A rotary laser beam emitting apparatus 1000 capable of automatically setting an inclination comprises a laser beam emitting unit 10, a rotary laser beam projecting unit 13 for turning a laser beam in a reference plane, an inclination setting unit for determining an inclination, a direction finding unit for finding a direction of inclination, and a turning unit for directing a main body of the apparatus in the direction of inclination.

Figure 1:
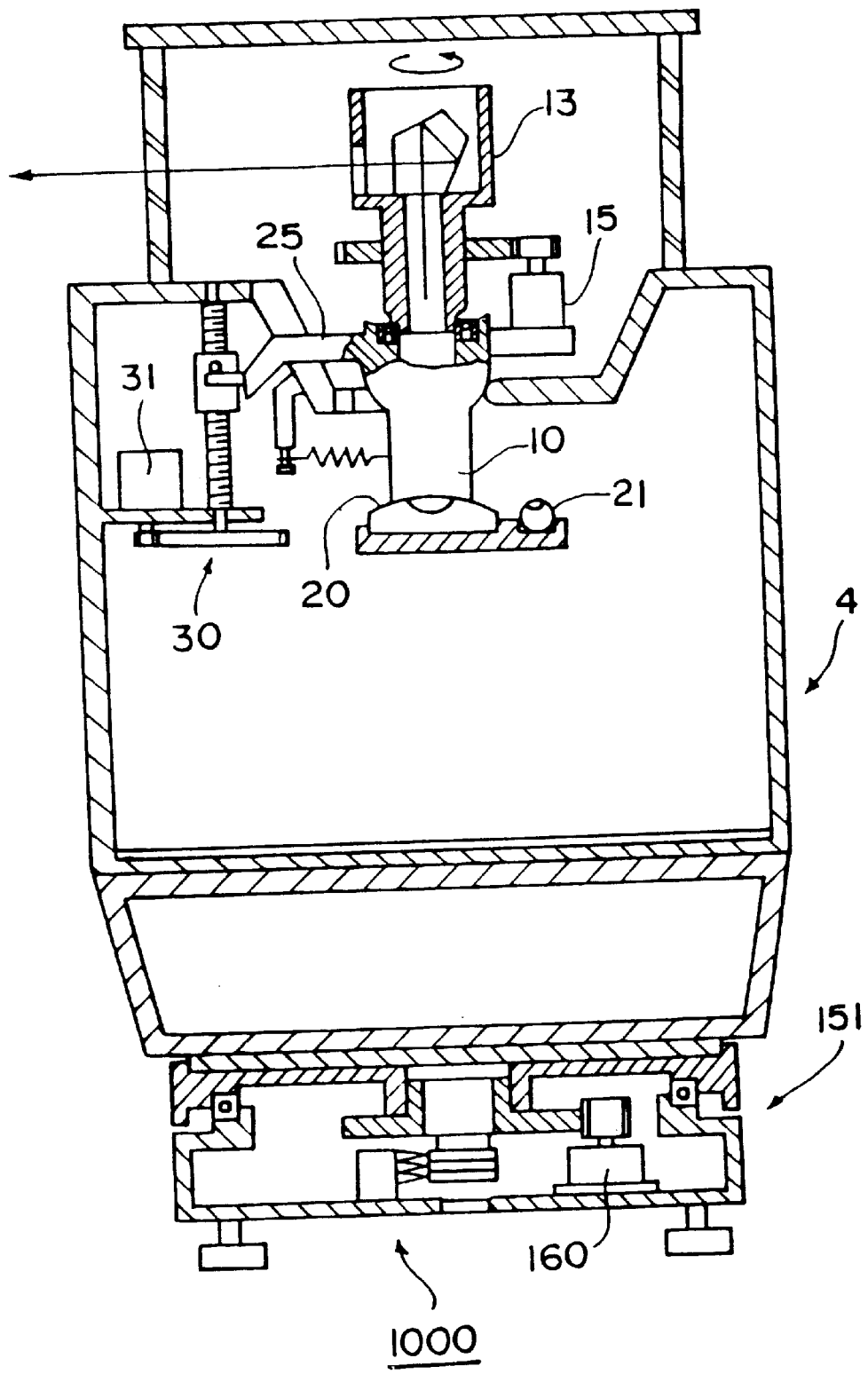
FIG. 1 is a schematic sectional view of a laser beam emitting apparatus in a preferred embodiment according to the present invention.

As shown in FIG. 1, the laser beam emitting unit 10 is supported on a spherical support structure (or a gimbals) to emit a laser beam vertically upward. The rotary laser beam projecting unit 13 is disposed above the laser beam emitting unit 10 to turn a laser beam in a reference plane. The rotary laser beam projecting unit 13 is rotated or turned in opposite directions for scanning by a scanning motor 15. An arm member 25 having two perpendicular arms is moved vertically by driving a lifting mechanism included in the inclination setting unit by an tilting motor 31 to tilt the laser beam emitting unit 10 with respect to one or two directions. The inclination setting unit serves also as a leveling unit for leveling the laser beam emitting unit 10. The inclination setting unit performs a leveling operation on the basis of signals provided by inclination sensors 20 and 21 mounted on the main body 4.

Referring to FIG. 2 showing the optical and electrical systems of the rotary laser beam emitting apparatus 1000, the main body 4 comprises a light emitting unit 162, a rotating unit 163, a reflected light detecting unit 164, a scanning drive unit 165, a light emitting device driving unit 166, a controller 117 and a rotative drive unit 169.

The light emitting unit 162 comprises a laser diode 101, a collimator lens 102 and an apertured mirror 103. Laser light emitted by the laser diode 101 is collimated in a laser beam by the collimator lens 102, the laser beam travels through the apertured mirror 103 to the rotating unit 163. The photodetecting unit. 104 comprises a condenser lens 110, a second photodetector 114 and a reflected light detecting circuit 116. The laser diode 101 is modulated by the light emitting device driving unit 166, and the laser light emitted by the laser diode 101 can be distinguished from external light. The rotating unit 163 projects the laser beam received from the light emitting unit 162 in a horizontal direction. The rotating unit 163 comprises a pentagonal prism 18, a scanning motor 15 for driving the pentagonal prism 18, and an encoder 105 for finding the angular position of the pentagonal prism 18. The pentagonal prism 18 deflects the laser beam emitted by the light emitting unit 162 through an angle of 90° so that the laser beam travels horizontally. The pentagonal prism 18 is supported for rotation about the optical axis of the light emitting unit 162. The reflected light detecting unit 164 comprises a condenser lens 110, a second photodetector 114 and a reflected light detecting circuit 116. The second photodetector 114 receives the reflected laser beam from the reflector 168 and gives a reflected laser beam detection signal to the reflected light detecting circuit 116.

Figure 3A:
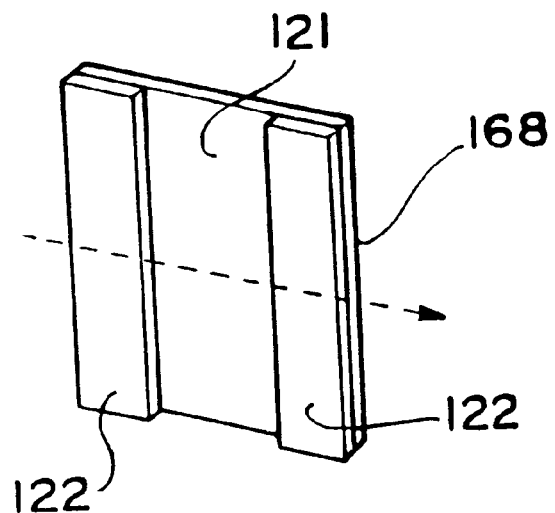
FIGS. 3(A) and 3(B) are a perspective view and a front elevation, respectively, of a reflector.
Figure 3B:
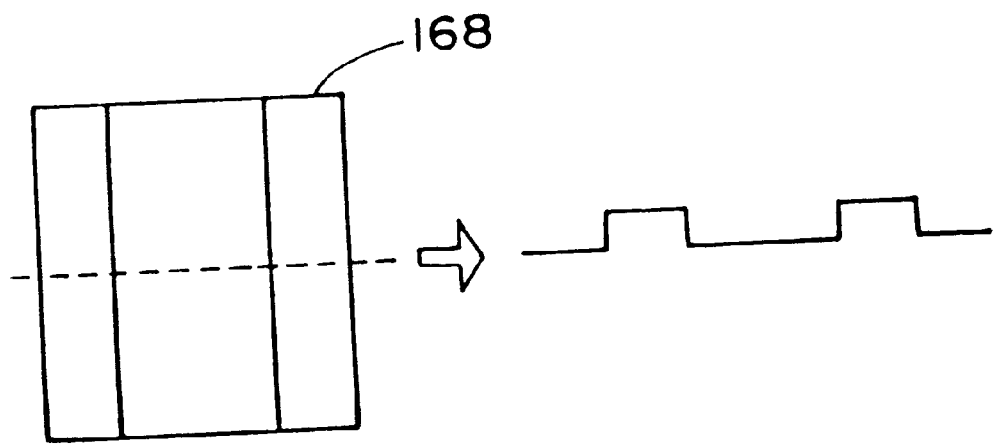

The reflector 168 reflects the laser beam projected by the rotating unit 163 toward the rotating unit 163. Referring to FIG. 3(A), the reflector 168 has a base plate 121, and two reflecting layers 122 formed on opposite side parts of the base plate 121. The two reflecting layers 122 facilitates identifying the reflected laser beam reflected from the reflector 168. When the reflector 168 is scanned by the laser beam, the laser beam is reflected twice in one scanning cycle as shown in FIG. 3(B). The reflected laser beams fall on the pentagonal prism 18 of the rotating unit 163 and is deflected by the apertured mirror 103 through an angle of 90° toward the reflected light detecting unit 164. The controller 117 calculates the position of the center of gravity of the reflected laser beams representing the center of the reflector 168 on the basis of the respective output signals of the reflected light detecting circuit 116 and the encoder 105. The rotative drive unit 169 controls the rotating unit 163 on the basis of the position of the center of gravity calculated by the controller 117.

In operation, the main body 4 is leveled and then the rotary light projecting unit 13 is driven by the scanning motor 15 to make the laser beam emitted by the light emitting unit 162 sweep a horizontal plane. Referring to FIG. 2, the laser beam emitted by the light emitting unit 162 is deflected by the pentagonal prism 18 of the rotary light projecting unit 13 so as to travel in a horizontal plane. The reflected laser beam reflected from the reflector 168 on the plane falls on the rotary light projecting unit 13 and is reflected by the apertured mirror 103. The reflected pulse laser beam reflected by the apertured mirror 103 travels through the condenser lens 110 and falls on the second photodetector 114, and the second photodetector 114 gives a detection signal to the reflected light detecting circuit 116.

Part of the laser beam projected by the rotary light projecting unit 13 is directed toward the first photodetector 300 disposed in the predetermined direction (or inclination setting direction). The controller 117 calculates the position of the reflector 168 and the inclination of the main body 4 on the basis of the output signal of the encoder indicating the angular position of the rotary light projecting unit 13, and the output signals of the first photodetector 300 and the second photodetector 114. If the directions do not coincide with each other, the controller 117 controls the rotative drive unit 169 to correct an error and to turn the main body so as to direct the main body toward the reflector 168. The rotating unit 163 corresponds to a rotating means. The rotation is stopped upon the coincidence of the direction of the reflector 168 and the tilting direction of the main body, and then an inclination is set. A reference plane inclined at a level angle θ to the target can be formed by setting the level angle θ and driving the scanning motor 15 to turn the laser beam for scanning after correctly disposing the main body 4 relative to the reflector 168.

Referring to FIG. 6, the laser beam reflected by the mirror 100 disposed between the pentagonal prism 18 and the reflector 168 travels through the condenser lens 200 and falls on the two-section photodetector 310. The two-section photodetector 310 has the first photodetecting section 311 and the second photodetecting section 312. The two-section photodetector 310 provides output signals of waveforms as shown in FIG. 8. A continuous waveform is formed by subtracting the output signal of the second photodetecting section 312 from that of the first photodetecting section 311. A zero-cross point corresponds to a reference position for the pentagonal prism 18. The integral photodetector 320 as shown in FIG. 7 may be used instead of the two-section photodetector 310. When the main body 4 is disposed correctly relative to the reflector 168, the mirror 100 is inserted in a path between the pentagonal prism 18 and the reflector 168 to reflect part of the laser beam. Thus, the inclination of the main body 4 is corrected to remove an error in the position of the rotary light projecting unit 13. The laser beam falls on the two-section photodetector 310 only when the direction of travel of the laser beam projected by the rotary light projecting unit 13 coincides with the direction of inclination of the main body 4. Therefore, the direction of inclination of the main body 4 and the direction of the reflector 168 coincide with each other when the output signal of the controller 117 which recognizes the reflected laser beam and the output of the two-section photodetector 310 coincide with each other.

This embodiment may be provided with a decision means which decides that the direction of inclination of the main body coincides with the direction of the reflector when the respective output signals of the controller 117 and the two-section photodetector 310 coincide with each other.

The two-section photodetector 310 corresponds to a photodetecting means. The two-section photodetector 310 enables the accurate recognition of the zero-cross point to achieve highly accurate detection.

A slit plate may be placed on an optical path between the condenser lens 200 and the photodetector 320 as shown in FIG. 7 to enable only the laser beam traveling in a specific direction to fall on the photodetector 320, which enables highly accurate detection by using a single photodetector.

As is apparent from the foregoing description, in the laser beam emitting apparatus according to the present invention, the light emitting unit emits laser light, the rotary light projecting unit projects a laser beam and turns the laser beam in a plane, the first photodetector receives at least part of the laser beam projected by the rotary light projecting unit from a predetermined direction, the second photodetector detects the reflected laser beam reflected from the reflector, and the data processing means determines an error in the direction of the main body relative to the reflector on the basis of the output signals of the first and the second photodetector. Thus, the inclination of the main body is corrected and the error in the rotary light projecting unit can be removed.

What is claimed is:

1. A laser beam emitting apparatus comprising:
   a light emitting unit which emits a laser beam;
   a rotary laser beam projecting unit which projects and turns the laser beam emitted by the light emitting unit in a plane;
   a first photodetector which receives at least a part of the laser beam projected by the rotary laser beam projecting unit from a predetermined direction;
   a second photodetector which detects a reflected laser beam reflected from a reflector; and
   a data processing means which determines an error in the direction of a main body relative to the reflector on the basis of detection signals provided by the first and the second photodetector.

2. A laser beam emitting apparatus comprising:
   a light emitting unit which emits a laser beam;
   a rotary laser beam projecting unit which projects and turns the laser beam emitted by the light emitting unit in a plane;
   a first photodetector which receives at least a part of the laser beam projected by the rotary laser beam projecting unit from a predetermined direction;
   a second photodetector which detects a reflected laser beam reflected from a reflector;
   an encoder which finds angular position of the rotary laser beam projecting unit; and
   a data processing means which determines an error in the direction of a main body relative to the reflector on the basis of detection signals provided by the first and the second photodetectors and the encoder.

3. The laser beam emitting apparatus according to claim 1 or 2, wherein the laser beam projected by the rotary laser beam projecting unit is received through a mirror.

4. The laser beam emitting apparatus according to claim 3, wherein the mirror is a half mirror.

5. The laser beam emitting apparatus according to claims 1, wherein the first photodetector has a first photosensor and a second photosensor.

6. The laser beam emitting apparatus according to claims 1, wherein a slit plate is placed on an optical path through which a laser beam travels to the first photodetector.

7. A laser beam emitting apparatus comprising:
   a light emitting unit which emits a laser beam;
   a rotary laser beam projecting unit which projects and turns the laser beam emitted by the light emitting unit in a plane;
   a first photodetector which receives at least part of the laser beam projected by the rotary laser beam projecting unit from a predetermined direction;
   a second photodetector which detects a reflected laser beam reflected from a reflector;
   a data processing means which determines an error in the direction of a main body relative to the reflector on the basis of detection signals provided by the first and the second photodetector; and
   a rotative driving means which turns the main body on the basis of an output signal provided by the data processing means.

8. The laser beam emitting apparatus according to claim 2, wherein the first photodetector has a first photosensor and a second photosensor.

9. The laser beam emitting apparatus according to claim 3, wherein the first photodetector has a first photosensor and a second photosensor.

10. The laser beam emitting apparatus according to claim 4, wherein the first photodetector has a first photosensor and a second photosensor.

11. The laser beam emitting apparatus according to claim 2, wherein a slit is placed on an optical path through which a laser beam travels to the first photodetector.

12. The laser beam emitting apparatus according to claim 3, wherein a slit is placed on an optical path through which a laser beam travels to the first photodetector.

13. The laser beam emitting apparatus according to claim 4, wherein a slit is placed on an optical path through which a laser beam travels to the first photodetector.

14. The laser beam emitting apparatus according to claim 5, wherein a slit is placed on an optical path through which a laser beam travels to the first photodetector.

15. The laser beam emitting apparatus according to claim 8, wherein a slit is placed on an optical path through which a laser beam travels to the first photodetector.

16. The laser beam emitting apparatus according to claim 9, wherein a slit is placed on an optical path through which a laser beam travels to the first photodetector.

17. The laser beam emitting apparatus according to claim 10, wherein a slit is placed on an optical path through which a laser beam travels to the first photodetector.

* * * * *

UNITED STATES PATENT AND TRADEMARK OFFICE
CERTIFICATE OF CORRECTION

PATENT NO. : 6,108,075
DATED : August 22, 2000
INVENTOR(S) : Ohtomo et al.

It is certified that error appears in the above-identified patent and that said Letters Patent is hereby corrected as shown below:

<u>Title page,</u>
Item [73] Assignee: "Topcorn," should read -- Topcon, --
Item [75] Inventors: "Otomo," should read -- Ohtomo, --

<u>Column 6,</u>
Line 34, "claims" should read -- claim --
Line 37, "claims" should read -- claim --

Signed and Sealed this

Sixth Day of November, 2001

Attest:

*Nicholas P. Godici*

NICHOLAS P. GODICI
*Attesting Officer*   *Acting Director of the United States Patent and Trademark Office*